United States Patent
Chung et al.

(10) Patent No.: US 7,781,055 B2
(45) Date of Patent: Aug. 24, 2010

(54) TRANSPARENT HEAT SHIELDING MULTILAYER STRUCTURE

(75) Inventors: Pao-Tang Chung, Hsinchu (TW);
Sung-Jeng Jong, Pingtung Hsien (TW);
Jer-Young Chen, Hsinchu (TW);
Yih-Her Chang, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 12/189,932

(22) Filed: Aug. 12, 2008

(65) Prior Publication Data
US 2009/0291295 A1    Nov. 26, 2009

(30) Foreign Application Priority Data
May 26, 2008  (TW) ............... 97119333 A

(51) Int. Cl.
*B32B 5/16* (2006.01)
(52) U.S. Cl. .................... 428/328; 428/323
(58) Field of Classification Search ............ 428/323, 428/328
See application file for complete search history.

(56) References Cited

U.S. PATENT DOCUMENTS

| | | | |
|---|---|---|---|
| 6,911,254 B2* | 6/2005 | Fisher et al. | 428/328 |
| 2002/0090507 A1 | 7/2002 | Barth et al. | |
| 2006/0008640 A1* | 1/2006 | Chonan et al. | 428/328 |
| 2007/0048519 A1 | 3/2007 | Anderson et al. | |
| 2007/0134499 A1* | 6/2007 | Fisher et al. | 428/413 |
| 2007/0135534 A1 | 6/2007 | Fisher et al. | |
| 2007/0256782 A1* | 11/2007 | Haldeman et al. | 156/308.2 |

FOREIGN PATENT DOCUMENTS

| | | | |
|---|---|---|---|
| CN | 1807321 A | | 7/2006 |
| JP | 2003201155 A | * | 7/2003 |
| JP | 2005-47179 | | 2/2005 |

OTHER PUBLICATIONS

Certincoat® low e glass product literature downloaded from http://www.arkema-inc.com/index.cfm?pag=84 on Jun. 16, 2010.*

* cited by examiner

*Primary Examiner*—Callie E Shosho
*Assistant Examiner*—Elizabeth Robinson
(74) *Attorney, Agent, or Firm*—Lowe Hauptman Ham & Berner, LLP

(57) ABSTRACT

A transparent heat shielding multilayer structure is disclosed. The multilayer structure includes: a transparent base film; a first transparent heat shielding layer with lanthanum hexaboride ($LaB_6$) nanoparticles dispersed therein; and a second heat shielding layer with ATO (antimony doped tin oxide), ITO (indium tin oxide), or metal doped tungsten oxide nanoparticles dispersed therein. The first and second transparent heat shielding layers may be disposed on the same side or opposite sides of the transparent base film.

18 Claims, 4 Drawing Sheets

TRANSPARENT HEAT SHIELDING MULTILAYER STRUCTURE

CROSS REFERENCE TO RELATED APPLICATIONS

This application claims priority of Taiwan Patent Application No. 97119333, filed on May 26, 2008, the entirety of which is incorporated by reference herein.

BACKGROUND OF THE INVENTION

1. Field of the Invention

The present invention relates to a transparent heat shielding material, and in particular relates to a transparent heat shielding multilayer structure with low haze levels.

2. Description of the Related Art

Commercial heat shielding films are primarily silver-based multilayer sputter coatings. Major drawbacks of the heat shielding films include the necessity for expensive sputtering equipment and a multilayer structure for protection of unstable silver coatings. As a result, commercial heat shielding films are often expensive. Accordingly, it would be highly desirable to provide a low cost, highly stable heat shielding film which can be fabricated by an inexpensive, low-temperature coating process.

To avoid the expensive sputtering process, transparent heat shielding films fabricated by simple coating methods have been proposed, in which inorganic metal nanoparticles that absorb particular wavelength bands of radiation are dispersed in a resin binder. However, the inorganic nanoparticles tend to have poor dispersity and problems such as visible light scattering, high haze levels, low visible light transmittance, or low heat shielding efficiency may arise.

U.S. Pat. No. 6,911,254 discloses an infrared (IR) absorbing laminate comprising at least one substrate, a reflective film, and an IR absorbing sheet. The reflective film comprises a metallized polyethylene terephthalate sheet or a multi-layer spectrally selective film. The IR absorbing sheet comprises lanthanum hexaboride nanoparticles, indium tin oxide nanoparticles, antimony tin oxide nanoparticles, or mixtures thereof, dispersed in a thermoplastic polymeric matrix.

U.S. Patent Publication No. 20020090507 discloses an optically active film composite including a layer of resin binder having a thickness of less than 6 microns and a pencil hardness of at least 2H. The optically active film composite also includes nanoparticles of at least one metallic compound absorbing light having a wavelength in the range of 1000-2500 nm, and nanoparticles of a second metallic inorganic compound absorbing light having a wavelength in the range of 700-1100 nm. Characteristics of the composite include shielding against infrared light and anti-scratch capabilities.

U.S. Patent Publication No. 20070048519 discloses a solar control laminate comprising a solar control film comprising inorganic infrared absorbing nanoparticles and a polymeric sheet, wherein the polymeric sheet and the solar control film are adjoining. The inorganic infrared absorbing nanoparticles comprise nanoparticles of antimony tin oxide (ATO), indium tin oxide (ITO), lanthanum hexaboride ($LaB_6$) or mixtures of two or more thereof.

U.S. Patent Publication No. 20070135534 discloses a polymer film comprising lanthanum hexaboride and an epoxy agent. The addition of an epoxy agent provides a stabilization effect to the lanthanum hexaboride, which allows for the production of polymer films that advantageously resist environmental degradation. Thus, the polymer films produced have a significant number of applications, such as applications in display devices, applications as protective coverings, and glazing film applications.

Japanese Patent Publication No. 2005047179 discloses a heat ray shielding polycarbonate resin sheet, wherein at least one side of a polycarbonate resin sheet containing average particle sizes of 100 nm or below of lanthanum boride fine particles, is coated with a transparent resin layer containing an ultraviolet absorber.

The above described patents disclose heat shielding films comprising antimony tin oxide (ATO), lanthanum hexaboride ($LaB_6$), alone or in combination, dispersed in resin binders. However, according to studies, a single layered film comprising ATO suffers from high haze levels and insufficient infrared rejection properties. Additionally, a single layered film comprising $LaB_6$ has poor infrared rejection. Meanwhile, if ATO and $LaB_6$ are combined in the same layer to increase heat shielding performance, haze levels would increase.

Therefore, an improved heat shielding film is needed which can be fabricated by simple coating methods and improve heat shielding performance without increasing the haze levels.

BRIEF SUMMARY OF THE INVENTION

The invention provides a transparent heat shielding multilayer structure with low haze levels and improved heat shielding properties. The heat shielding multilayer structure has a haze of less than 1% and can be fabricated by common heat-shielding coating materials.

The transparent heat shielding multilayer structure of the invention comprises: a transparent base film; a first transparent heat shielding layer with lanthanum hexaboride ($LaB_6$) nanoparticles dispersed therein; and a second transparent heat shielding layer with nanoparticles of antimony doped tin oxide (ATO), indium tin oxide (ITO), or metal doped tungsten oxide dispersed therein.

The first and the second transparent heat shielding layers may be disposed on the same side or opposite sides of the transparent base film. Furthermore, an additional transparent base film may be disposed on the first transparent heat shielding layer or the second transparent heat shielding layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In one embodiment of the invention, antimony tin oxide (ATO) absorbing light having a wavelength between 1000 nm and 2500 nm is used in combination with lanthanum hexaboride (LaB$_6$) absorbing light having a wavelength between 700 nm and 1100 nm. In contrast to the conventional heat shielding film that incorporates antimony tin oxide and lanthanum hexaboride in the same layer, the present invention employs antimony tin oxide and lanthanum hexaboride in separate layers to produce a multilayer structure with improved heat shielding properties while maintaining a low haze level of below 1%. As such, the problems of high haze levels due to mixing of different nanoparticles or insufficient heat shielding performance with the prior art approaches can be solved. In other embodiments, since antimony tin oxide (ATO), tin doped indium oxide (ITO) and metal doped tungsten oxide (M$_x$WO$_y$, wherein x is 0.001-1, y is 2.2-3.0, and M is, for example, Li, Na, K, Rb, or Cs) have similar absorbing characters at wavelengths between 1000 nm and 2500 nm, ITO and/or metal doped tungsten oxide can be employed to replace ATO without changing the principle of the invention. However, when two or more of ATO, ITO, and metal doped tungsten oxide are employed, they are preferably provided in different layers.

FIGS. 1-5 are schematic views showing heat shielding multilayer structures according to various embodiments of the invention. Each of the multilayer structures includes at least a transparent base film 10, a first transparent heat shielding layer 11 containing lanthanum hexaboride (LaB$_6$) nanoparticles, and a second transparent heat shielding layer 12 containing nanoparticles of antimony doped tin oxide (ATO), indium tin oxide (ITO), or metal doped tungsten oxide (M$_x$WO$_y$).

Figure 1:
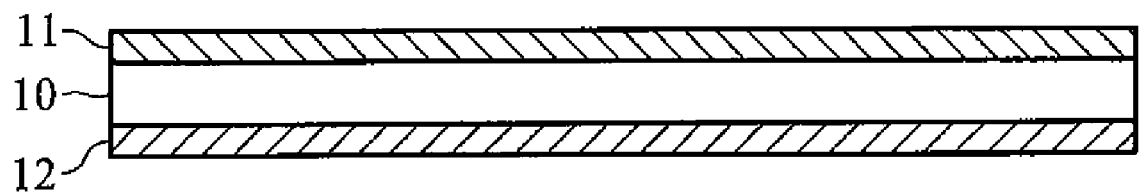
FIGS. 1-5 are schematic views showing heat shielding multilayer structures according to various embodiments of the invention.
Figure 2:
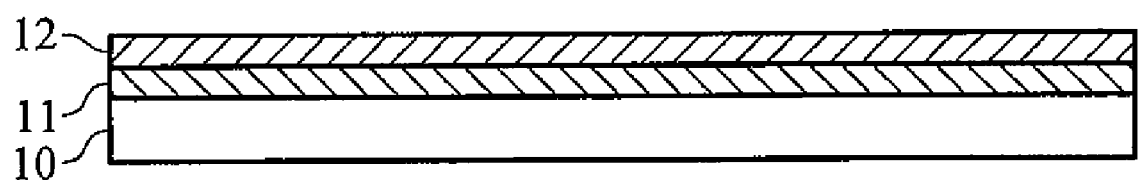
Figure 3:
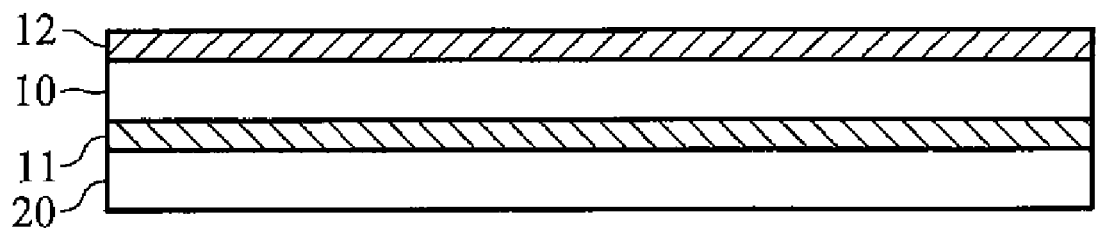

During fabrication of the multilayer structures, the lanthanum hexaboride (LaB$_6$) nanoparticles are dispersed in a binder material to form a first coating solution for the first transparent heat shielding layer 11. Similarly, the nanoparticles of antimony doped tin oxide (ATO), indium tin oxide (ITO), or metal doped tungsten oxide (M$_x$WO$_y$) are dispersed in a binder material to form a second coating solution for the second transparent heat shielding layer 12. The first and second coating solutions, respectively are applied onto a transparent substrate such as a glass or a polymeric film by wet coating techniques to form a multilayer structure. In one embodiment, the first and second coating solutions are coated on opposite sides of a transparent base film 10, thus forming the multilayer structure as shown in FIG. 1. In another embodiment, two coating solutions are sequentially coated on the same side of the transparent base film 10, thus forming the multilayer structure as shown in FIG. 2. In yet another embodiment, the two coating solutions are coated on different transparent base films 10, 20 and are subsequently laminated, thus forming the multilayer structure as shown in FIG. 3.

Figure 4:
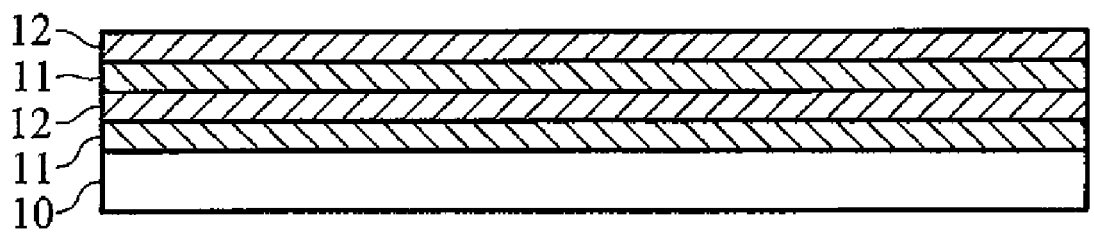
Figure 5:
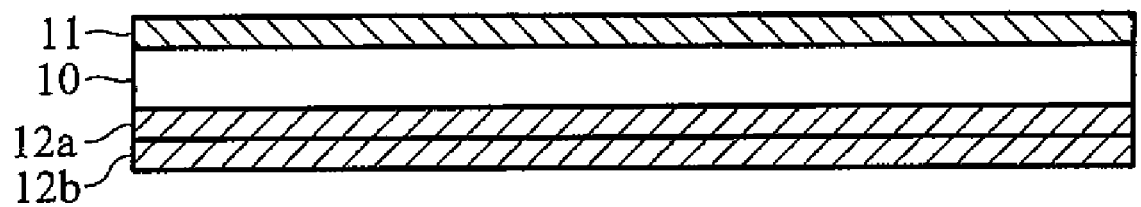

In addition, the multilayer structure of the invention may include two or more pairs of the first and second transparent heat shielding layers 11, 12. Thus, although only one pair of the heat shielding layers 11, 12 is illustrated in the multilayer structures of FIGS. 1-3, they may be provided with more pairs of the heat shielding layers. For example, FIG. 4 shows an addition pair of the heat shielding layers 11, 12 disposed on the multilayer structure of FIG. 2. Furthermore, two different types of second transparent heat shielding layers may be employed. For example, FIG. 5 shows a multilayer structure including two different types of second transparent heat shielding layers 12a, 12b and one first transparent heat shielding layer 11. The second transparent heat shielding layers 12a, 12b comprise different inorganic nanoparticles selected from the group consisting of antimony doped tin oxide (ATO), indium tin oxide (ITO), and metal doped tungsten oxide (M$_x$WO$_y$). Again, although FIG. 5 depicts two second transparent heat shielding layers 12a, 12b and one first transparent heat shielding layer 11, the invention is not limited thereto. Rather, more layers of different types of second transparent heat shielding layers and more than one first transparent heat shielding layer may be used. Also note that the relative positions of each layers of the multilayer structure may be re-arranged without changing the principle of the invention. For example, all the heat shielding layers may be disposed on the same side of the transparent base film 10, and the first transparent heat shielding layer 11 may be sandwiched between two second transparent heat shielding layers 12a, 12b.

Each of the transparent heat shielding layers comprises a binder material with radiation absorbing nanoparticles dispersed in the binder material. The first transparent heat shielding layer 11 comprises preferably about 0.1-80 wt %, and more preferably about 0.5-5 wt % of lanthanum hexaboride (LaB$_6$) nanoparticles. The second transparent heat shielding layer 12 comprises preferably about 5-80 wt %, and more preferably about 30-60 wt % of nanoparticles of antimony doped tin oxide (ATO), indium tin oxide, or metal doped tungsten oxide (M$_x$WO$_y$). The nanoparticles used herein preferably have an average diameter of less than 200 nm, and more preferably less than 100 nm.

The binder material that incorporates the nanoparticles may be organic or inorganic. The organic binder may include various thermoplastic or thermoset polymers, oligomers, prepolymers, monomers, or combinations thereof. Preferable organic binders include, but are not limited to, acrylic resins, epoxy resins, silicone resins, phenoxy resins, polyurethane resins, urea resins, acrylonitrile butadiene styrene (ABS) resins, polyether resins, fluorine-containing resins, polycarbonate, polystyrene, polyimide, starch, cellulose, copolymers thereof, and mixtures thereof. The inorganic binder may include silica gel or metal alkoxides suitable for sol-gel reactions. Specific examples of preferred metal alkoxides include silicon tetraethoxide (TEOS), aluminum triisopropoxide, zirconium tetrabutoxide, and titanium tetraisopropoxide.

The transparent heat shielding films of the invention may optionally include other ingredients, such as, for example, dispersants, thermal curing agents, ultraviolet (UV) curing agents, flame retardants, adhesives, colorants, fillers, UV stabilizers, and thermal stabilizers, provided that they do not deteriorate the heat shielding properties and transmittance of the heat shielding films. In a specific embodiment, the radiation absorbing nanoparticles are dispersed in a pressure-sensitive adhesive such that the multilayer structure can be adhered onto a glass or other substrates directly without a pressure-sensitive adhesive layer.

To prepare a coating solution, the radiation absorbing nanoparticles may be dispersed in a solvent by, for example, ball milling, and then mixed with the binder material to homogeneously distribute the nanoparticles throughout the coating solution. During ball milling, suitable dispersants may be added, which are selected by considering the surface characteristics of the nanoparticles and the particular binder material used. Suitable dispersants include, but are not limited to, polymeric dispersants such as salts of polyamine amides and polyesters, unsaturated polyamine amides, or inorganic acid ester salts. When used, the dispersant is preferably present in an amount of less than 50 weight percent, based on the weight of the nanoparticles. Alternatively, the nanoparticles, the binder material, and optional additives, may be directly mixed by other dispersion devices such as a beads mill, a sand grinder, a homogenizer, a mixer, or a kneader.

The coating solution may include one or more solvents, which is dependent upon the particular binder material used to form the coating. Suitable solvents include, but are not limited to, water, methanol, ethanol, n-butanol, isopropanol, cyclohexanone, methyl ethyl ketone, methyl isobutyl ketone, ethyl ether, ethylene glycol ethers such as ethylene glycol dimethyl ether, and ethylene glycol monoethyl ether, tetrahydrofuran (THF), propylene glycol monomethyl ether acetate (PGMEA), ethyl-2-ethoxyethyl acetate, 3-ethoxyethyl propionate, isoamyl acetate, chloroform, n-hexane, heptane, pentane, benzene, toluene, xylene, cyclohexane, and the like.

The coating solution may be coated on the transparent base film 10/20 by standard wet coating methods. The transparent base film 10/20 may comprise glass, or transparent resins such as poly(ethylene terephthalate) (PET), polycarbonate (PC), acrylic resins, polypropylene, polyethylene, polystyrene, polyvinyl chloride, and the like. The thickness of the transparent base film may be varied depending upon the particular requirements of the application. For automobile windshields, for example, the transparent base film preferably has a thickness within the range of about 1 mil to about 4 mils. Suitable wet coating methods for forming the heat shielding layers include, without limitation, spin coating, casting, bar coating, blade coating, roller coating, wire bar coating, and dip coating.

The coating on the transparent base film may be cured through a thermal or UV radiation process. The first transparent heat shielding film 11 and the second transparent heat shielding film 12 may have same or different thicknesses, each within the range of about 1 µm to about 50 µm, and preferably about 10 µm to about 30 µm.

The transparent heat shielding multilayer structure of the invention is featured by low haze levels and superior heat shielding properties. Under similar transmittances, the multilayer structure of the invention displays improved heat shielding performance over that of a single layer film containing ATO or $LaB_6$, or both. The increase of haze levels due to mixing of ATO and $LaB_6$ in the same layer is mitigated. In preferred embodiments, the transparent heat shielding multilayer structure exhibits a haze below 1% and a heat shielding index above 126, wherein the heat shielding index is defined as (Tvis+Rir)*100, in which Tvis represents visible light transmission and Rir represents infrared rejection. In more preferred embodiments, the multilayer structure exhibits a haze below 0.5% and a heat shielding index above 130.

PREPARATIVE EXAMPLE

ATO nanoparticles ("SN-100P"; Ishihara Industry Co.) were added to toluene to provide a 30 weight percent dispersion, followed by addition of a 40 weight percent of a polymeric dispersant, based on the weight of the ATO nanoparticles. The resulting mixture was ball milled by yttrium-stabilized $ZrO_2$ balls (diameter 2 mm) to produce a nano-dispersed suspension A.

$LaB_6$ nanoparticles (Strem Chemicals, Inc.) were added to toluene to provide a 10 weight percent dispersion, followed by addition of a 40 weight percent of a polymeric dispersant, based on the weight of the $LaB_6$ nanoparticles. The resulting mixture was ball milled by yttrium-stabilized $ZrO_2$ balls (diameter 2 mm) to produce a nano-dispersed suspension B.

COMPARATIVE EXAMPLE 1

Figure 6:
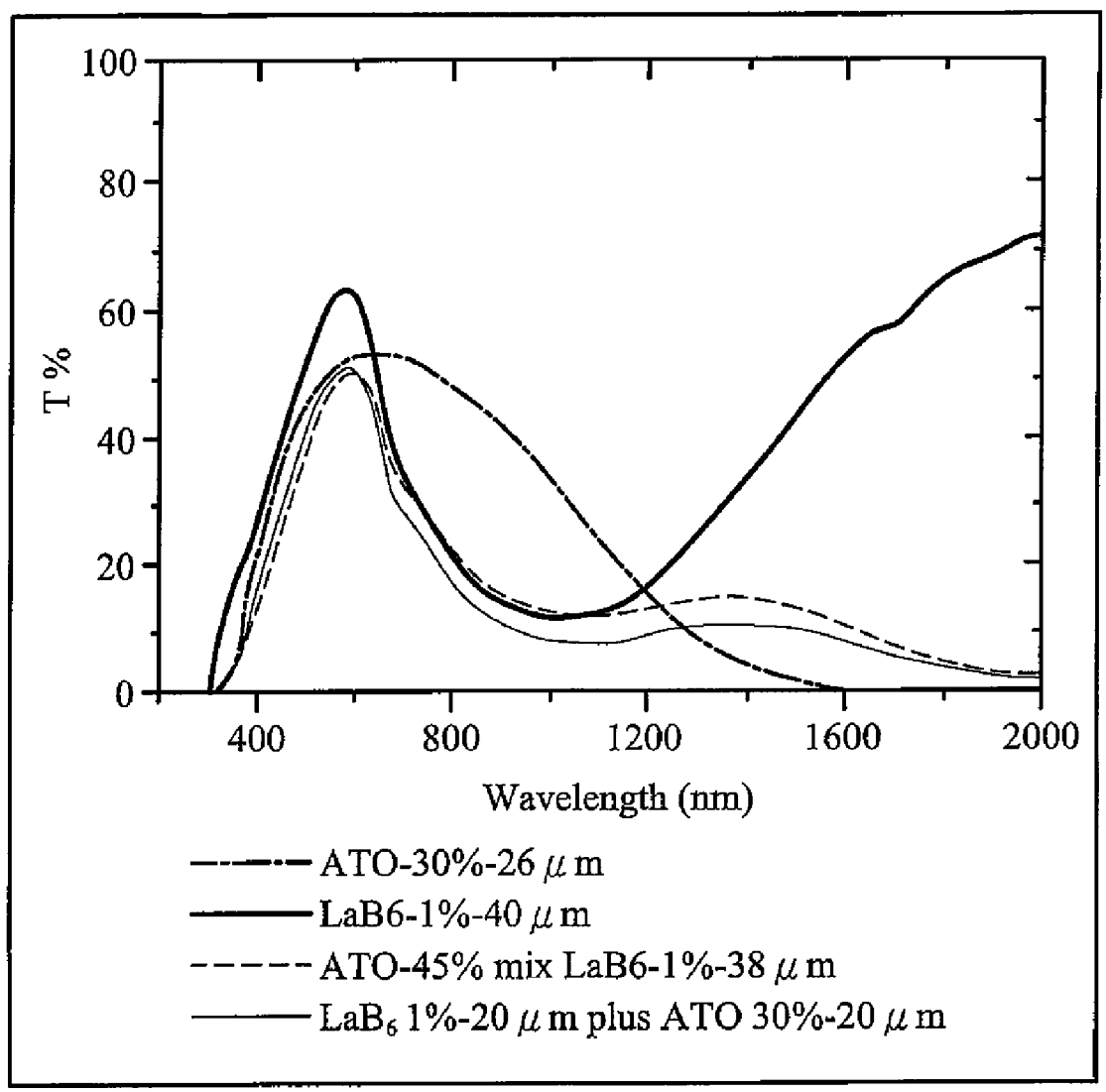
FIG. 6 shows UV-Vis-IR transmission spectrum of the heat shielding structures of Example 1 and Comparative Examples 1-3.

Single Layer Film Containing ATO 2 g of nano-dispersed suspension A was added to 5 g of acrylic resin (Lidye Chemical Co., Ltd.) with thorough mixing to provide a 30 weight percent coating solution. The coating solution was then coated on a PET film by blade coating, baked at 80° C. for a half hour to provide a 26 µm-thick ATO heat shielding film. The UV-Vis-IR spectrum of the heat shielding film was measured and the results are shown in FIG. 6 and Table 1. The single layer ATO film exhibited a heat shielding index ((Tvis+Rir)*100) of 120, and a haze of 4.6%.

COMPARATIVE EXAMPLE 2

Single Layer Film Containing $LaB_6$ 0.15 g of nano-dispersed suspension B was added to 5 g of acrylic resin with thorough mixing to provide a 1 weight percent coating solution. The coating solution was then coated on a PET film by blade coating, baked at 80° C. for a half hour to provide a 40 µm-thick $LaB_6$ heat shielding film. The UV-Vis-IR spectrum of the heat shielding film was measured and the results are shown in FIG. 6 and Table 1. The single layer $LaB_6$ film exhibited a heat shielding index ((Tvis+Rir)*100) of 121, and a haze of 0.11%.

COMPARATIVE EXAMPLE 3

Single Layer Film Containing ATO and $LaB_6$ 2 g of nano-dispersed suspension A was added to 10 g of acrylic resin with thorough mixing, followed by addition of 0.15 g of nano-dispersed suspension B to provide a 30 weight percent coating solution. The coating solution was then coated on a PET film by blade coating, baked at 80° C. for a half hour to provide a 38 µm-thick ATO/$LaB_6$ hybrid heat shielding film. The UV-Vis-IR spectrum of the heat shielding film was measured and the results are shown in FIG. 6 and Table 1. The single layer ATO/$LaB_6$ hybrid film exhibited a heat shielding index ((Tvis+Rir)*100) of 123, and a haze of 2.5%.

EXAMPLE 1

Multilayer Structure Containing ATO and $LaB_6$ Layers 2 g of nano-dispersed suspension A was added to 5 g of acrylic resin with thorough mixing to provide a 30 weight percent coating solution. The coating solution was then coated on the upper surface of a PET film by blade coating, baked at 80° C. for a half hour to provide a 20 µm-thick ATO heat shielding film.

0.15 g of nano-dispersed suspension B was added to 5 g of acrylic resin with thorough mixing to provide a 1 weight percent coating solution. The coating solution was then coated on the bottom surface of the PET film by blade coating, baked at 80° C. for a half hour to provide a 20 µm-thick ATO/$LaB_6$ multilayer heat shielding structure. The UV-Vis-IR spectrum of the heat shielding film was measured and the results are shown in FIG. 6 and Table 1. The ATO/$LaB_6$ multilayer structure exhibited a heat shielding index ((Tvis+Rir)*100) of 130, and a haze of 0.6%.

TABLE 1

| | Comparative Example 1 | Comparative Example 2 | Comparative Example 3 | Example 1 |
|---|---|---|---|---|
| ATO content (wt. %) | 30 | 0 | 45 | 30 |
| $LaB_6$ content (wt. %) | 0 | 1 | 1 | 1 |
| Thickness of heat shielding film (μm) | 26 | 40 | 38 | 40 |
| $Rir^1$ (%) | 79 | 81 | 85 | 90 |
| $Tvis^1$ (%) | 41 | 40 | 38 | 40 |
| (Tvis + Rir) * 100 | 120 | 121 | 123 | 130 |
| Haze (%) | 4.6 | 0.1 | 2.5 | 0.6 |

[1]Tvis and Rir were calculated by measuring the spectrum, deviation <1

As can be seen from Table 1, under similar visible light transmission, the ATO/$LaB_6$ multilayer structure of Example 1 displayed improved heat shielding performance compared to the single layer ATO film of Comparative Example 1, the single layer $LaB_6$ film of Comparative Example 2, and the single layer ATO/$LaB_6$ hybrid film of Comparative Example 3. Table 1 also shows that the hybrid film of Comparative Example 3 exhibited a high haze level due to poor dispersity of different nanoparticles in the same layer. In comparison, the multilayer structure of Example I exhibited a low haze of less than 1% because heat shielding layers containing different nanoparticles were coated separately.

COMPARATIVE EXAMPLE 4

Optical Properties of Single Layer $LaB_6$ Film

Varying amounts of nano-dispersed suspension B were added to 5 g of acrylic resin with thorough mixing to provide coating solutions with $LaB_6$ contents ranging from 0.1 weight percent to 5 weight percent. Each of the coating solutions was then coated on a 1 mm-thick glass by blade coating, baked at 80° C. for a half hour to provide a $LaB_6$ heat shielding film of about 40 μm thickness. The UV-Vis-IR spectrum of the heat shielding films were measured and the results are shown Table 2.

TABLE 2

| $LaB_6$ content | $Rir^1$ (%) | $Tvis^1$ (%) | Thickness | Substrate |
|---|---|---|---|---|
| 0.1% | 14 | 94 | 41 μm | 1 mm glass |
| 0.5% | 34 | 83 | 39 μm | 1 mm glass |
| 1% | 76 | 50 | 40 μm | 1 mm glass |
| 2% | 81 | 40 | 40 μm | 1 mm glass |
| 3% | 92 | 25 | 39 μm | 1 mm glass |
| 5% | 97 | 11 | 38 μm | 1 mm glass |

[1]Tvis and Rir were calculated by measuring the spectrum, deviation <1

As shown in Table 2, the infrared rejection (Rir) of the single layer $LaB_6$ film reached 81% when the visible light transmission (Tvis) was above 40%. When the Rir was over 90%, however, the Tvis was well below 25%, which makes the film not suitable for practical use.

COMPARATIVE EXAMPLE 5

Optical Properties of Single Layer ATO/$LaB_6$ Hybrid Film 0.15 g of nano-dispersed suspension B was added to 10 g of acrylic resin with thorough mixing, followed by addition of varying amounts of nano-dispersed suspension A to provide coating solutions with ATO contents ranging from 20 weight percent to 45 weight percent. Each of the coating solutions was then coated on a 1 mm-thick glass by blade coating, baked at 80° C. for a half hour to provide a single layer ATO/$LaB_6$ hybrid heat shielding film of about 40 μm thickness. The UV-Vis-IR spectrum of the heat shielding films were measured and the results are shown Table 3.

TABLE 3

| Nanoparticle contents | $Rir^1$ (%) | $Tvis^1$ (%) | Thickness | Haze (%) | Substrate |
|---|---|---|---|---|---|
| $LaB_6$ 1% + ATO 20% | 67 | 57 | 40 μm | 2 | 1 mm glass |
| $LaB_6$ 1% + ATO 30% | 73 | 50 | 39 μm | 2.1 | 1 mm glass |
| $LaB_6$ 1% + ATO 40% | 79 | 44 | 40 μm | 2.2 | 1 mm glass |
| $LaB_6$ 1% + ATO 45% | 85 | 39 | 38 μm | 2.5 | 1 mm glass |

[1]Tvis and Rir were calculated by measuring the spectrum, deviation < 1

As shown in Table 3, the hybrid films containing a mixture of ATO and $LaB_6$ all resulted in at least a 1% increase of haze. This increase of haze was also confirmed by the study disclosed in U.S. Patent Publication No. 2002/0090507.

EXAMPLE 2

Optical Properties of Multilayer Structure Containing ATO and LaB Layers

Varying amounts of nano-dispersed suspension A were added to 5 g of acrylic resin with thorough mixing to provide coating solutions with ATO contents ranging from 20 weight percent to 45 weight percent. Each of the coating solutions was then coated on the upper surface of a 1 mm-thick glass by blade coating, baked at 80° C. for a half hour to provide an ATO heat shielding film.

0.15 g of nano-dispersed suspension B was added to 5 g of acrylic resin with thorough mixing to provide a 1 weight percent coating solution. The coating solution was then coated on the bottom surface of the glass by blade coating, baked at 80° C. for a half hour to provide an ATO/$LaB_6$ multilayer heat shielding structure, wherein the total thickness of heat shielding films was in the range from 30 μm to 50 μm. The UV-Vis-IR spectrum of the heat shielding multilayer structure were measured and the results are shown Table 4.

TABLE 4

| Nanoparticle contents and thickness | $Rir^1$ (%) | $Tvis^1$ (%) | Haze (%) | Substrate |
|---|---|---|---|---|
| $LaB_6$ 1% 20 μm + ATO 45% 30 μm | 92 | 35 | 0.7 | 1 mm glass |
| $LaB_6$ 1% 20 μm + ATO 30% 20 μm | 90 | 39 | 0.6 | 1 mm glass |
| $LaB_6$ 1% 15 μm + ATO 30% 25 μm | 81 | 49 | 0.4 | 1 mm glass |
| $LaB_6$ 1% 15 μm + ATO 20% 15 μm | 75 | 55 | 0.4 | 1 mm glass |

[1]Tvis and Rir were calculated by measuring the spectrum, deviation <1

As shown in Table 4, the multilayer structures containing varying proportions of ATO and $LaB_6$ all exhibited superior heat shielding properties as well as low haze levels. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transparent heat shielding multilayer structure, comprising a transparent base film;
  a first transparent heat shielding layer with a first radiation absorbing nanoparticle consisting of lanthanum hexaboride ($LaB_6$) dispersed therein, wherein the first transparent heat shielding layer is free from nanoparticles of antimony doped tin oxide (ATO), indium tin oxide (ITO), and metal doped tungsten oxide; and
  a second transparent heat shielding layer with nanoparticles a second radiation absorbing nanoparticle selected from the group consisting of antimony doped tin oxide (ATO), indium tin oxide (ITO), Li, Na, K or Rb doped tungsten oxide dispersed therein, wherein the second transparent heat shielding layer is free from nanoparticles of lanthanum hexaboride $LaB_6$ and Cs dosed tungsten oxide,
  wherein the first and the second transparent heat shielding layers are disposed on the same side or opposite sides of the transparent base film.

2. The transparent heat shielding multilayer structure as claimed in claim 1, wherein the transparent base film comprises glass, transparent resins, or combinations thereof.

3. The transparent heat shielding multilayer structure as claimed in claim 1, wherein the first transparent heat shielding layer comprises about 0.1-80 wt % of lanthanum hexaboride ($LaB_6$) nanoparticles.

4. The transparent heat shielding multilayer structure as claimed in claim 1, wherein the second transparent heat shielding layer comprises about 5-80 wt % of antimony doped tin oxide (ATO), indium tin oxide (ITO), or Li, Na, K or Rb doped tungsten oxide nanoparticles.

5. The transparent heat shielding multilayer structure as claimed in claim 1, wherein each of the first and the second transparent heat shielding layers, independently, has a thickness of about 1-50μm.

6. The transparent heat shielding multilayer structure as claimed in claim 1, wherein each of the first and the second transparent heat shielding layers further comprises organic binder, inorganic binder, or pressure sensitive adhesive.

7. The transparent heat shielding multilayer structure as claimed in claim 1, wherein the transparent heat shielding multilayer structure has a haze below 1%.

8. The transparent heat shielding multilayer structure as claimed in claim 1, wherein the first and the second transparent heat shielding layers are disposed on the same side of the transparent base film.

9. The transparent heat shielding multilayer structure as claimed in claim 1, wherein the first and the second transparent heat shielding layers are disposed on opposite sides of the transparent base film.

10. The transparent heat shielding multilayer structure as claimed in claim 1, further comprising an additional transparent base film disposed on one of the first and the second transparent heat shielding layers.

11. The transparent heat shielding multilayer structure as claimed in claim 1, which comprises at least two pairs of the first and the second transparent heat shielding layers.

12. The transparent heat shielding multilayer structure as claimed in claim 1, which comprises two or more layers of the second transparent heat shielding layer, and each of the second transparent heat shielding layers contain different nanoparticles.

13. A method of making the transparent heat shielding multilayer structure, as claimed in claim 1, comprising:
  dispersing a first radiation absorbing nanoparticle consisting of lanthanum hexaboride ($LaB_6$) in a first binder material to form a form a first coating solution;
  dispersing a second radiation absorbing nanoparticle selected from the group consisting of antimony doped tin oxide (ATO), indium tin oxide (ITO), and Li, Na K or Rb doped oxide in a second binder material to form a form a second coating solution;
  coating one side of a transparent base film with the first coating solution to form a first transparent heat shielding layer; and
  coating the same side or the opposite side of the transparent base film with the second coating solution to form a second transparent heat shielding layer.

14. The method according to claim 13, wherein the transparent base film comprises glass, transparent resins, or combinations thereof.

15. The method according to claim 13, wherein the first transparent heat shielding layer comprises about 0.1-80 wt % of lanthanum hexaboride ($LaB_6$) nanoparticles.

16. The method according to claim 13, wherein the second transparent heat shielding layer comprises about 5-80 wt % of antimony doped tin oxide (ATO), indium tin oxide (ITO), or Li, Na, K or Rb doped tungsten oxide nanoparticles.

17. The method according to claim 13, wherein each of the first and the second transparent heat shielding layers, independently, has a thickness of about 1-50μm.

18. The method according to claim 13, wherein the transparent heat shielding multilayer structure has a haze below 1%.

* * * * *